Patented Sept. 25, 1923.

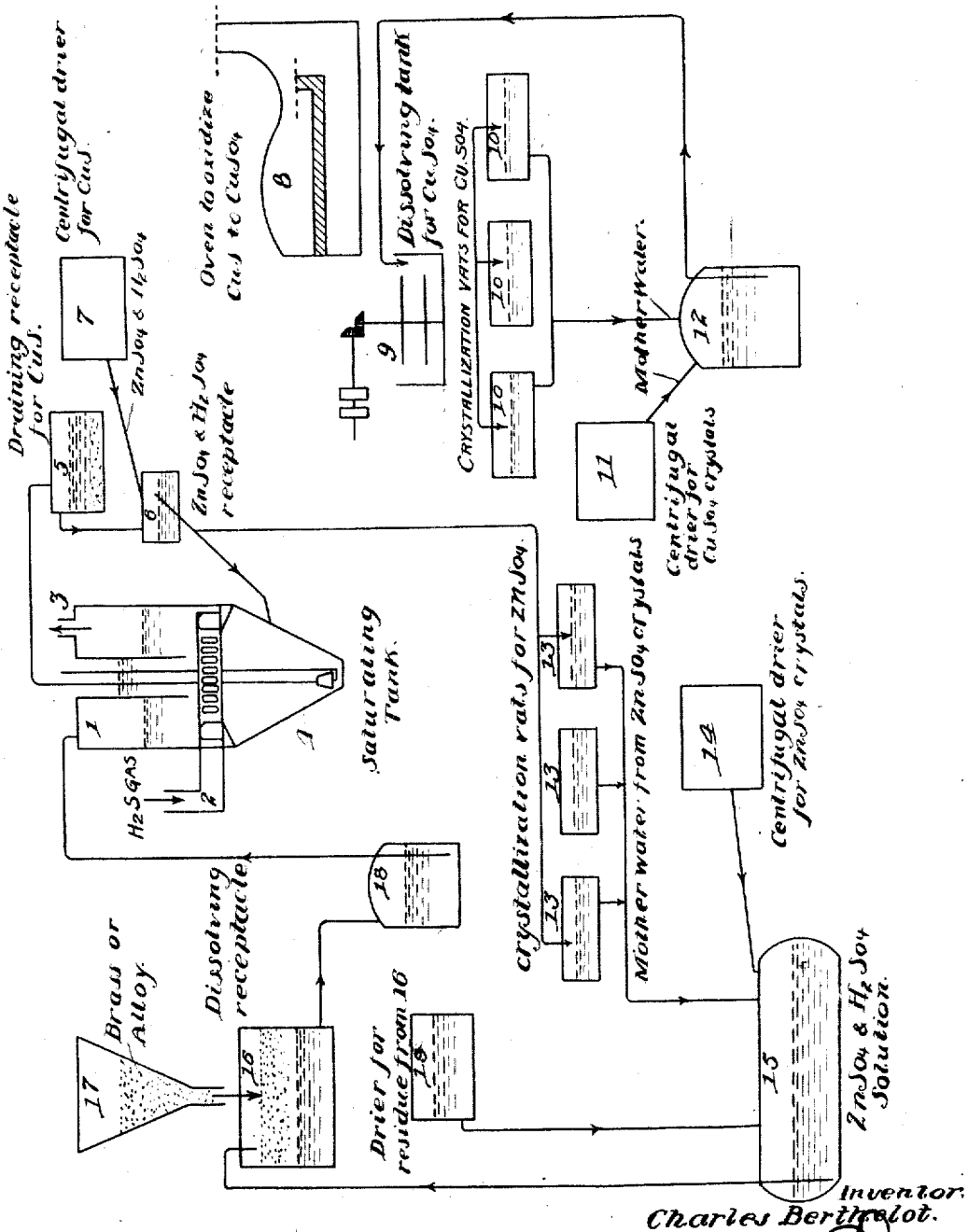

1,468,988

UNITED STATES PATENT OFFICE.

CHARLES BERTHELOT, OF PARIS, FRANCE.

PROCESS FOR UTILIZING GASES CONTAINING HYDROGEN SULPHIDE IN THE SEPARATION OF METALS.

Application filed July 14, 1920. Serial No. 396,295.

*To all whom it may concern:*

Be it known that CHARLES BERTHELOT, a citizen of the Republic of France, and a resident of Paris, Seine, France, has invented certain new and useful Improvements in Process for Utilizing Gases Containing Hydrogen Sulphide in the Separation of Metals (for which I have filed an application in France November 21, 1918), of which the following is a full, clear, and exact description, such as will enable others skilled in the art to which it appertains to carry out the same.

The invention has for its object a process for utilizing the hydrogen sulphide produced by the carbonization of combustibles, or any gas consisting wholly of or only in part hydrogen sulphide, for the chemical separation of copper, zinc and other metals.

The method of chemical separation of copper and of zinc by means of hydrogen sulphide is not unknown, but up to the present it has never been thought to utilize for this purpose the sulphureted hydrogen contained in the gas produced by the carbonization of organic residues, which by carbonization give off hydrogen sulphide. Coal gas specially contains from 5 to 10 grams of hydrogen sulphide per cubic metre. It is well known that the sulphur compounds contained in the gas used both for lighting purposes and motive power constitute prejudicial impurities which necessitate costly installations to eliminate: whereas, on the contrary, by the process, which is the object of the present invention, the sulphur is made to become a very valuable by-product, only needing for its oxidization the oxygen contained in the air although other oxidizing agents could be made use of.

By illustrating for an example the separation of copper and zinc, the process will readily be understood, reference being made to the annexed diagram:

The solution of sulphate of copper and of sulphate of zinc, which results either from the eating away of brass by the action of sulphuric acid, or by the solution in sulphuric acid of residues of brass mixed with inert substances, or by any other way in which the sulphuric acid works upon the brass, is put in direct contact with the gas produced by the carbonization of combustibles (gas for lighting purposes, gas from coke retorts, etc.).

The copper sulphite formed is collected separately, dryed and oxidized either by a dry or wet process to transform it into sulphate of copper, when its crystallization is effected in the manner already known.

As to the solution of the sulphate of zinc and the sulphuric acid, it is after the complete precipitation of the copper, partially removed from the circuit, when it is sufficiently rich in sulphate of zinc. This salt is for the most part separated by crystallization whilst the mother waters are again made use of for the dissolving of other quantities of brass residues.

The accompanying diagram gives an example of a scheme for such an installation:

1 represents the saturating tank which may be of any design, provided the sulphate of copper and sulphate of zinc in solution is put in contact with the gas. In the form of saturating tank shown in the drawing, the gas enters the inlet pipe 2, and is forced through the solution; and after contact with the solution leaves the tank by the outlet 3. The copper sulphide is extracted from the tank in which it is precipitated by means of a steam or compressed air ejector 4, which drives it into a draining receptacle 5, but this separation can be effected by means of decantation or filtration. The sulphate of zinc-sulphuric acid solution returns to the saturating tank by way of the receptacle 6 through the connecting tubes, whilst the copper sulphide is separated from its mother liquor and dried in the centrifugal dryer 7, the mother waters running into the receptacle 6 and thence to the saturating tank 1. The copper sulphide is then oxidized in the oven 8, from which it emerges in the form of copper sulphate. This passes into the dissolving tank 9, and then the solution is left to repose for crystallization in the receptacle 10.

The sulphate of copper crystals are dried in the centrifugal dryer 11. The mother waters accruing, as also those issuing from tanks 10 are collected in the receptacle 12, whence they are forced by any means into the dissolving tank 9.

When the solution is sufficiently rich in sulphate of zinc, there is removed (after the complete precipitation of the copper) a certain portion, which is replaced by an equal quantity of sulphuric acid and zinc sulphate solution coming from the tank 15, and which is left to repose in the receptacles 13. The sulphate of zinc crystals so separated are dried in the centrifugal dryer 14. The mother waters issuing from 13 and 14 are caught in the reservoir 15, where they have added to them the fresh acid necessary to compensate for the inevitable but small losses in sulphuric acid.

The sulphuric acid and zinc sulphate solution are finally forced into the receptacle 16, where it attacks the residues of the brass introduced, for example, into the hopper 17. The copper sulphate, zinc sulphate and sulphuric acid are collected in storage reservoirs and then forced into the saturating tank.

If the brass be mixed with inert substances, these substances, after the complete solution of the brass, are dried in 19 in order to recover the adherent sulphuric acid, which passes into the receptacle 15.

It may be pointed out that this method allows of the complete recovery of the sulphur from the gas treated, as well as the perfect separation of the copper and zinc sulphates.

This method is moreover applicable in a general way for the treatment of solutions where other metals are mixed with the copper and the zinc, and to those where the copper and the zinc is present in the state of salts other than sulphate. It can for instance, be applied to the treatment of solutions resulting from the action of any acids on brass, bronze, alloys or more or less compound ores.

The same process may also be applied for separating the copper from the nickel in solutions of alloys of the said metals, notably nickeled plates, or where the said metals are mixed whatever the acid used for these solutions.

Again, this process can be applied for the separation or copper and aluminium in the solutions resulting from the treatment with acid of bronze, of aluminium or of every other mixture of copper and of aluminium.

Moreover, the same process can be made use of for the separation of tin from other metals. This method allows an economic saving of the tin in the residue of tinned sheet iron.

The process of this invention can also be applied for the production of sulphates without the expenditure of sulphuric acid. Taking for example the production of sulphate of copper, a solution of sulphate is treated by the gas of carbonization containing sulphureted hydrogen, the sulphide of copper is precipitated and the sulphuric acid is reconstituted

$$SO_4Cu + H_2S = SO_4H_2 + CuS$$

The sulphuric acid separated from the sulphide of copper is made use of to dissolve a new quantity of copper residues for example; as to the sulphide of copper, it is oxidized either by a wet or dry means to be transformed by the process already known into sulphate.

In the process described above it is said that the said process is only utilizing the hydrogen sulphide contained in the gas when this acid is in free state. That supposes consequently the recovery, that is to say the elimination, of the ammonia.

Still it could be found useful in certain cases to use the hydrogen sulphide when same is combined with the ammonia of the gas.

This new application of a known principle can be employed for example to the separation of copper from tin.

Thus having described the nature of the invention, and explained the process in practice, I herewith declare that what I claim is:

1. The process of separating copper from zinc consisting in treating a solution containing these metals with hydrogen sulphide, separating the precipitated copper sulphide and then dissolving further quantities of the metals with the remaining solution.

2. The process of separating copper from zinc consisting in treating a solution containing these metals with hydrogen sulphide, separating the precipitated copper sulphide dissolving further quantities of the metals with the remaining solution and repeating the separation and dissolving of the metals until the remaining solution is sufficiently enriched in a compound of zinc that separation by crystallization may be accomplished.

3. The process of separating copper from zinc consisting in treating a solution containing these metals with hydrogen sulphide, separating the precipitated copper sulphide dissolving further quantities of the metals with a part of the remaining solution and replacing the said withdrawn part by a solution of the metals formed from preceding withdrawn parts.

4. The process of separating copper from zinc consisting in treating a solution containing these metals with hydrogen sulphide, separating the precipitated copper sulphide, dissolving further quantities of the metals with a part of the remaining solution, replacing the said withdrawn part by a solution of the metals formed from preceding withdrawn parts and repeating the separation and dissolving of the metals until the part of the solution withdrawn after separation is sufficiently enriched in a compound of zinc not separated from the solution that separation by crystallization may be accomplished.

5. The process of separating copper from zinc consisting in treating an acidified solution containing these metals with hydrogen sulphide, separating the precipitated copper sulphide, dissolving further quantities of the metals with the remaining solution and repeating the separation and dissolving of the metals until the remaining solution is sufficiently enriched in a compound of zinc that separation by crystallization may be accomplished, separating by crystallization the constituents enriching the solution and dissolving further quantities of the metals with the mother liquor resulting from the crystallization.

6. The process of separating copper from zinc consisting in treating an acidified solution containing these metals with hydrogen sulphide, separating the precipitated copper sulphide dissolving further quantities of the metals with a part of the remaining solution and replacing the said withdrawn part by a solution of the metals formed by preceding withdrawn parts.

7. The process of separating copper from zinc consisting in treating an acidified solution containing these metals with hydrogen sulphide, separating the precipitated copper sulphide, dissolving further quantities of the metals with a part of the remaining solution and replacing the said withdrawn part by a solution of the metals formed by preceding withdrawn parts and repeating the separation and dissolving of the metals.

8. The process of separating copper from zinc consisting in treating an acidified solution containing these metals with hydrogen sulphide, separating the precipitated copper sulphide, dissolving further quantities of the metals with a part of the remaining solution, replacing the said withdrawn part by a solution of the metals formed from preceding withdrawn parts and repeating the separation and dissolving of the metals until the part of the solution withdrawn after separation is sufficiently enriched in a compound of zinc not separated from the solution that separation by crystallization may be accomplished.

9. The process of separating copper from zinc consisting in treating an acidified solution containing these metals with hydrogen sulphide, separating the precipitated copper sulphide, dissolving further quantities of the metals with a part of the remaining solution, replacing the said withdrawn part by a solution of the metals formed from preceding withdrawn parts and repeating the separation and dissolving of the metals until the part of the solution withdrawn after separation is sufficiently enriched in a compound of zinc not separated from the solution that separation by crystallization may be accomplished, separating by crystallization the zinc compound enriching the said part and dissolving further quantities of the metals with the mother liquor resulting from the crystallization.

In witness whereof, I have hereunto signed my name this 12th day of June, 1920, in the presence of two subscribing witnesses.

CHARLES BERTHELOT.

Witnesses:
ANDRÉ BRUNET,
CLEMENT S. EDWARDS.